(12) United States Patent
Xie

(10) Patent No.: US 9,707,698 B1
(45) Date of Patent: Jul. 18, 2017

(54) METHOD AND APPARATUS FOR FORMING MARBELIZED ENGINEERED STONE

(71) Applicant: Alex Xie, West Windsor, NJ (US)

(72) Inventor: Alex Xie, West Windsor, NJ (US)

(*) Notice: Subject to any disclaimer, the term of this patent is extended or adjusted under 35 U.S.C. 154(b) by 0 days.

(21) Appl. No.: 15/467,623

(22) Filed: Mar. 23, 2017

(51) Int. Cl.
| | |
|---|---|
| *B44F 9/04* | (2006.01) |
| *B29C 43/14* | (2006.01) |
| *B28B 5/02* | (2006.01) |
| *B28B 3/00* | (2006.01) |
| *B29C 67/24* | (2006.01) |
| *B28B 13/02* | (2006.01) |

(52) U.S. Cl.
CPC ............ *B28B 5/027* (2013.01); *B28B 3/00* (2013.01); *B29C 43/145* (2013.01); *B29C 67/243* (2013.01); *B28B 13/022* (2013.01); *B44F 9/04* (2013.01)

(58) Field of Classification Search
None
See application file for complete search history.

(56) References Cited

U.S. PATENT DOCUMENTS

| | | | |
|---|---|---|---|
| 1,939,045 A * | 12/1933 | Fredriksen | B29C 43/20 106/242 |
| 2,556,486 A | 6/1951 | Smith | |
| 3,255,024 A | 6/1966 | Alexander | |
| 5,664,305 A | 9/1997 | Lawton | |
| 9,186,819 B1 * | 11/2015 | Grzeskowiak, II | B28B 1/005 |
| 9,289,923 B1 * | 3/2016 | Grzeskowiak, II | B29C 39/12 |
| 2002/0081388 A1 | 6/2002 | Batliner et al. | |
| 2006/0193693 A1 | 8/2006 | Congdon | |
| 2009/0105391 A1 | 4/2009 | Buskila et al. | |
| 2013/0137810 A1 * | 5/2013 | Shin | C04B 26/06 524/437 |
| 2014/0141961 A1 * | 5/2014 | Koszo | B28B 3/02 501/155 |
| 2015/0314475 A1 * | 11/2015 | Banus | B28B 1/081 425/405.1 |
| 2016/0089818 A1 * | 3/2016 | Xie | B29C 67/243 264/241 |

FOREIGN PATENT DOCUMENTS

WO   WO 2010/097727 A2   2/2010

* cited by examiner

*Primary Examiner* — Mary F Theisen
(74) *Attorney, Agent, or Firm* — Walter J. Tencza, Jr.

(57) ABSTRACT

An apparatus including a first dispensing device configured to supply a first material to a conveyor belt of the main conveyor device in response to control by the computer processor, and a second dispensing device configured to supply a second material on top of the first material, while the first material is on the conveyor belt to form a combination comprised of at least the first and second materials, in response to control by the computer processor. The combination may be compressed by a first compression device in response to control by the computer processor. The compressed combination may be stirred by a first stirring device in response to control by the computer processor to form a first modified combination. The first modified combination may be compressed by a second compression device in response to control by the computer processor to form a compressed first modified combination.

15 Claims, 11 Drawing Sheets

METHOD AND APPARATUS FOR FORMING MARBELIZED ENGINEERED STONE

FIELD OF THE INVENTION

This invention relates to improved methods and apparatus concerning forming marbleized engineered stone.

BACKGROUND OF THE INVENTION

Quartz is the second most abundant mineral in the Earth's crust and is one of the hardest naturally occurring materials. One application is in the formation of "engineered stone", a composite material made of particulate material such as stone, quartz, glass, shells or silicon mixed with polymer resins, dyes, binders, etc. or any combination of such. The particulate material(s) and polymer resins, binders, colorants, dyes, etc. may be poured into a supporting mold, tray or other supporting structure. The mold or tray containing the mixture is then moved into a vacuum press machine to compress the material. The compressed material is then placed into a curing machine to be heated into a hardened quartz slab. After curing, the slab is generally moved to a grinder to be grinded down to a desired thickness, followed by a polisher to finish the product.

Engineered stone, including quartz, has become a common surfacing and countertop choice throughout the world. Applications include kitchen and bath countertops, tables and desktops, floor tile, food service areas, wall cladding, and various other horizontal and vertical applications. Quartz based engineered stone has many advantages over natural stone such as marble and granite; it is harder, more durable and less water absorbent than natural stone, and is more resistant to staining, scratching, heat and chemicals. One main disadvantage to engineered stone is its lack of random color patterns and veining found in natural stone.

SUMMARY OF THE INVENTION

One or more embodiments of the present invention address a method, apparatus, and system of producing a quartz based slab with color patterns and veining similar to natural stone. In at least one embodiment, a composite material is mixed which may include or may consist of particulate stone, quartz, glass, shells or silicon mixed with polymer resins, dyes, binders, hardeners, initiators or combination of such. This damp composite material is crushed and load into a container. Each container contains a different composite material. The composite material can vary based on a number of factors such as particle size or dyes used. The container has rotating blades inside, the rotating blades is driven by a servo motor controlled by computer, the container has a rectangular exit opening at the bottom which is less than the width of the belt that lies below it. The belt is driven by a servo motor, the speed of which is controlled by computer, and a gate to control the height of the composite material as it travels through the gate. The speed of the rotating blades inside the container and the speed of the belt may be adjusted in order to obtain a desired amount of composite material per unit area on the belt. The gate can be raised or lowered in order to further adjust the amount of material.

Based on the desired design aesthetic multiple sets of above can be used. Each secondary belt sits above a primary moving belt driven by a servo motor, the speed of which can be controlled by computer. One composite material from the first secondary belt is dropped on to the primary moving belt to form the first layer of composite material. When the first composite material on the primary belt has traveled to the position of the second secondary belt, the second composite material from the second secondary belt is dropped directly on top of the first layer of composite material to form two layers of different composite material. When this two-layer composite material on the primary belt has traveled to the position of the third secondary belt, composite material from the third secondary belt drops the third composite material directly on top of the two-layer composite material to form a three-layer composite material. More layers of composite material can be added in this fashion if needed.

A first press roller is used to compress the multi-layered composite material. The press roller is lowered using compressed air. The air pressure may be adjusted so that the pressure exerted by the roller onto the multi-layered composite material is equal throughout the length of the material on the belt. The rotating speed of the roller is controlled so that the linear speed of the press roller and primary belt are the same. The material then passes through a set of multi-pronged apparatus in order to break up and reorient the multi-layered fragments of composite material. The rotational speed of the multi-pronged apparatus may be adjusted based on the final design aesthetic desired. The higher the rotational speed, the smaller the fragments will be. The composite material then travels down the primary belt to a second press roller to compress the fragments of multi-layer of the composite material. The pressure that the second press roller exerts on the fragments of composite material may be adjusted based on the final aesthetic desired in order to maintain the pattern contained inside the fragments. The rotating speed of the second press roller is controlled so that the linear speed of the press roller and primary belt are the same. The composite material then travels down the primary belt to a second set of multi-pronged apparatus in order to again break up and reorient the multi-layered composite material. The rotational speed of the multi-pronged apparatus may be adjusted based on the final design aesthetic desired. The composite material then travels off the belt for further processing.

In at least one embodiment an apparatus is provided comprising a computer processor; a first dispensing device configured to be in communication with the computer processor and thereby controlled by the computer processor; a second dispensing device configured to be in communication with the computer processor and thereby controlled by the computer processor; a main conveyor device configured to be in communication with the computer processor and thereby controlled by the computer processor; a first compression device configured to be in communication with the computer processor and thereby controlled by the computer processor; a first stirring device configured to be in communication with the computer processor and thereby controlled by the computer processor; and a second compression device configured to be in communication with the computer processor and thereby controlled by the computer processor.

Each of the first and the second compression devices may be roller devices having rollers which are used to compress combinations of materials.

In at least one embodiment, the first dispensing device is configured to supply a first material to a conveyor belt of the main conveyor device in response to control by the computer processor. The second dispensing device may be configured to supply a second material on top of the first material, while the first material is on the conveyor belt to form a combination comprised of at least the first and second materials, in response to control by the computer processor. The combination may be compressed by the first compression device in response to control by the computer processor. The compressed combination may be stirred by the first stirring device in response to control by the computer processor to form a first modified combination. The first modified combination may be compressed by the second compression device in response to control by the computer processor to form a compressed first modified combination.

The apparatus may further include a first secondary conveyor device which includes a conveyor belt; and a second secondary conveyor device which includes a conveyor belt. The first first dispensing device may supply the first material to the conveyor belt of the main conveyor device by supplying the first material to the conveyor belt of the first secondary conveyor device which then supplies the first material to the conveyor belt of the main conveyor device, in response to control by the computer processor. The second dispensing device may supply the second material to the conveyor belt of the main conveyor device by supplying the second material to the conveyor belt of the second secondary conveyor device which then supplies the second material to the conveyor belt of the main conveyor device, in response to control by the computer processor.

The apparatus may further include a first secondary gate device which includes a gate; and a second secondary gate device which includes a gate. The computer processor may control a height of the gate of the first secondary gate device above the conveyor belt of first secondary conveyor device to control a thickness of first material supplied by the first dispensing device to the conveyor belt of the main conveyor device. The computer processor may control a height of the gate of the first secondary gate device above the conveyor belt of first secondary conveyor device to control a thickness of first material supplied by the first dispensing device to the conveyor belt of the main conveyor device.

The first dispensing device may be located at a first location along the main conveyor device, followed in series along the main conveyor device by the second dispensing device, the first compression device, the first stirring device, and the second compression device. In such a configuration and/or order, the first dispensing device is configured to supply the first material to the conveyor belt of the main conveyor device at the first location; the second dispensing device is configured to supply the second material on top of the first material, at a second location, different from the first location; the combination is compressed by the first compression device at a third location, different from the first and second locations, and further from the first location than the second location; the compressed combination is stirred by the first stirring device at a fourth location, different from the first, second, and third locations, and further from the first location than the first, second, and third locations; and the first modified combination is compressed by the second compression device in response at a fifth location, different from the first, second, third, and fourth locations, and further from the first location than the second, third, and fourth locations.

The apparatus may further include a main gate device, which includes a gate; and the computer processor may control a height of the gate above the conveyor belt of the main conveyor device to control a thickness of the compressed first modified combination.

The apparatus may further include a second stirring device configured to be in communication with the computer processor and thereby controlled by the computer processor; wherein the compressed first modified combination is stirred by the second stirring device in response to control by the computer processor to form a second modified combination.

In at least one embodiment the computer processor controls a height of the gate of the main gate device above the conveyor belt of the main conveyor device to control a thickness of the second modified combination.

In at least one embodiment a method is provided which includes supplying a first material to a conveyor belt of a main conveyor device; moving the first material by use of the conveyor belt; supplying a second material on top of the first material, while the first material is on the conveyor belt to form a combination comprised of at least the first and second materials; compressing the combination; stirring the compressed combination to form a first modified combination; and compressing the first modified combination to form a compressed first modified combination.

In at least one embodiment, the step of compressing the combination occurs after the combination has been moved by use of the conveyor belt from a first location where the step of supplying the second material on top of the first material occurred to a second location, which is different from the first location; the step of stirring the compressed combination occurs after the compressed combination has been moved by use of the conveyor belt from the second location to a third location which is different from the first location and the second location; and the step of the step of compressing the first modified combination occurs after the first modified combination has been moved by use of the conveyor belt from the third location to a fourth location which is different from the first location, the second location, and the third location.

In at least one embodiment, the method may include controlling a height of a gate above the conveyor belt of the main conveyor device to control a thickness of the compressed first modified combination.

The first material may be a crushed mixture which includes at least one of the following: particulate stone, quartz, glass, shells, silicon, polymer resins, binders, and colorants; and the second material may be a crushed mixture which includes at least one of the following: particulate stone, quartz, glass, shells, silicon, polymer resins, binders, and colorants.

The method may also include stirring the compressed first modified combination to form a second modified combination. The method may further include controlling a height of a gate above the conveyor belt of the main conveyor device to control a thickness of the second modified combination.

In at least one embodiment, the step of supplying the first material to the conveyor belt of the main conveyor device is performed at least in part by a first secondary conveyor device having a conveyor belt; and the step of supplying the second material on top of the first material is performed at least in part by a second secondary conveyor device having a conveyor belt.

In at least one embodiment, the step of supplying the first material to the conveyor belt of the main conveyor device is performed at least in part by a first secondary gate device, wherein a gate of the first secondary gate device is controlled to be a specific height above the conveyor belt of first secondary conveyor device to control a thickness of first material supplied by the first dispensing device to the conveyor belt of the main conveyor device; and the step of supplying the second material on top of the first material is performed at least in part by a second secondary gate device, wherein a gate of the second secondary device is controlled to be a specific height above the conveyor belt of second secondary conveyor device to control a thickness of second material supplied by the second dispensing device to the conveyor belt of the main conveyor device.

DETAILED DESCRIPTION OF THE DRAWINGS

Figure 1:
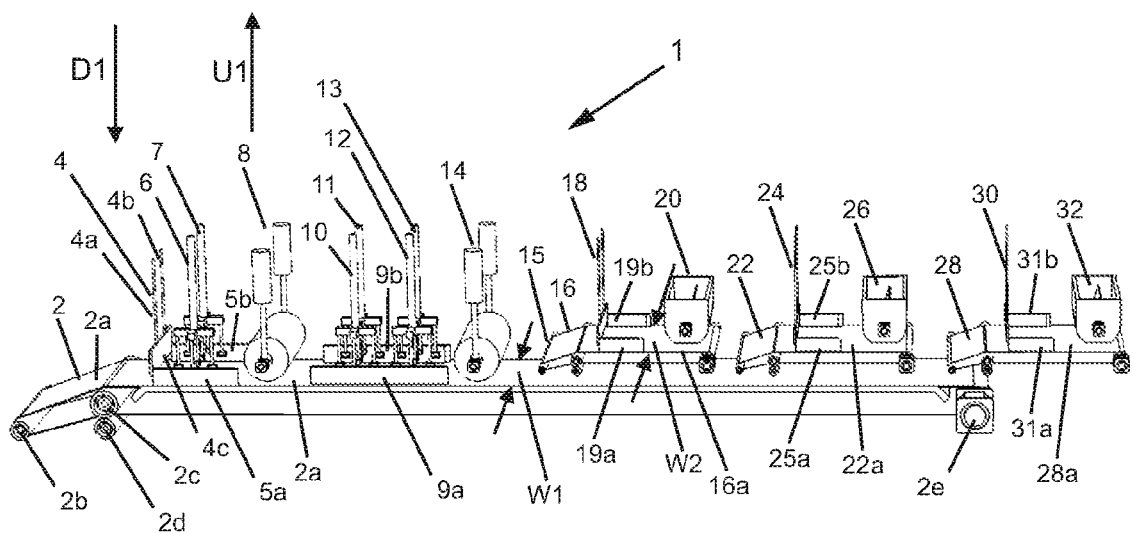
FIG. 1 shows a perspective view of an apparatus in accordance with an embodiment of the present invention.

FIG. 1 shows a perspective view of an apparatus 1 in accordance with an embodiment of the present invention. The apparatus 1 includes a conveyor device 2, a gate device 4, walls 5a and 5b, stirring devices 6 and 7, roller device 8, stirring devices 10, 11, 12, and 13, walls 9a and 9b, roller device 14, conveyor device 16, gate device 18, walls 19a and 19b, dispensing device 20, conveyor device 22, gate device 24, walls 25a and 25b, dispensing device 26, conveyor device 28, gate device 30, walls 31a and 31b, and dispensing device 32. Each of roller devices 8 and 14 may be considered a compression device.

Figure 9:
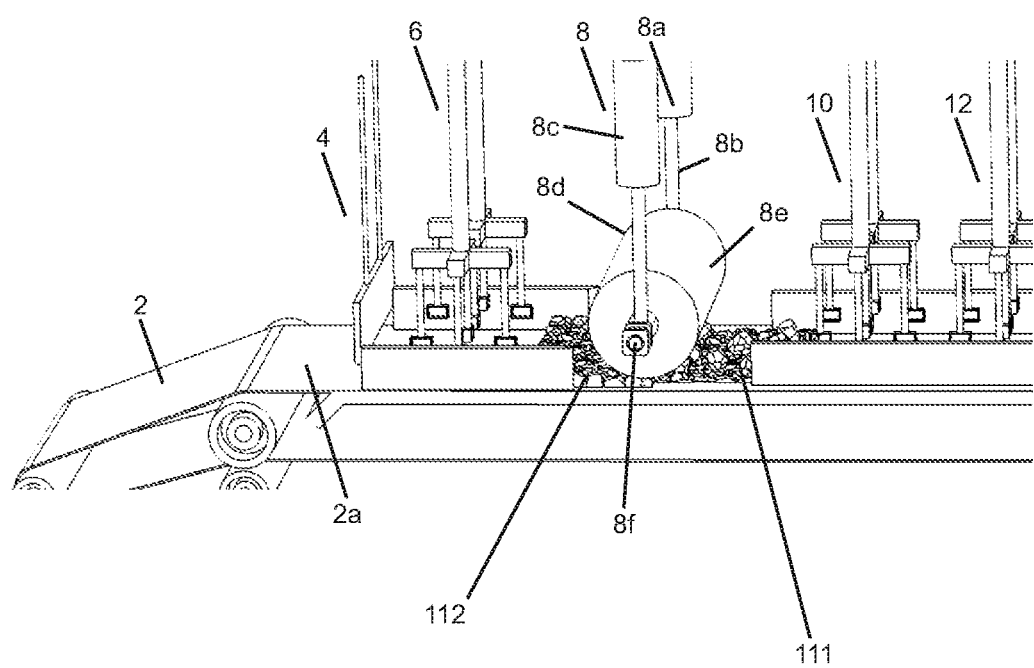
FIG. 9 shows a perspective close up view of part of the apparatus of FIG. 1, and with the first modified combination of FIG. 8 pressed by a roller device into a second modified combination in a sixth state.
Figure 10:
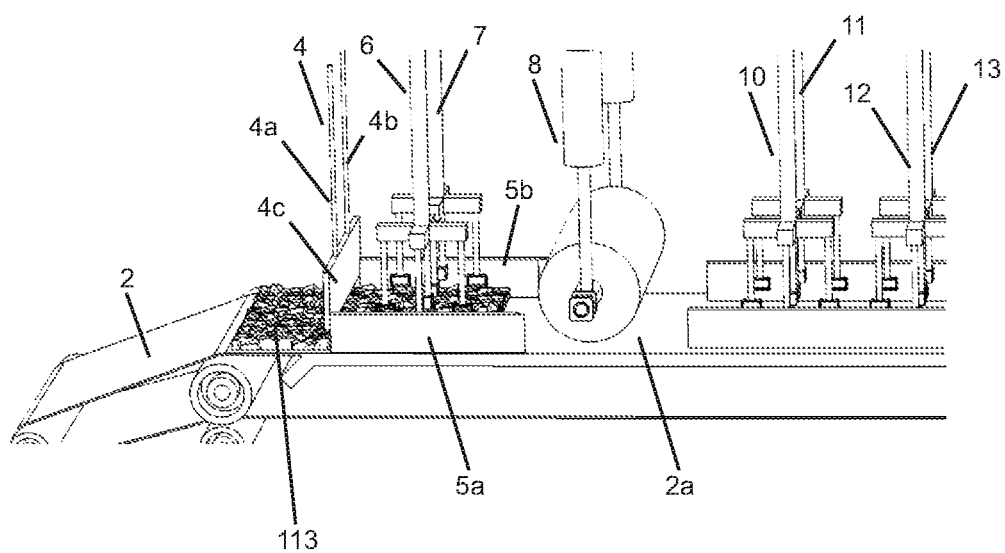
FIG. 10 shows a perspective close up view of part of the apparatus of FIG. 1, and with the second modified combination of FIG. 9 mixed or stirred into a third modified combination in a seventh state.
Figure 11:
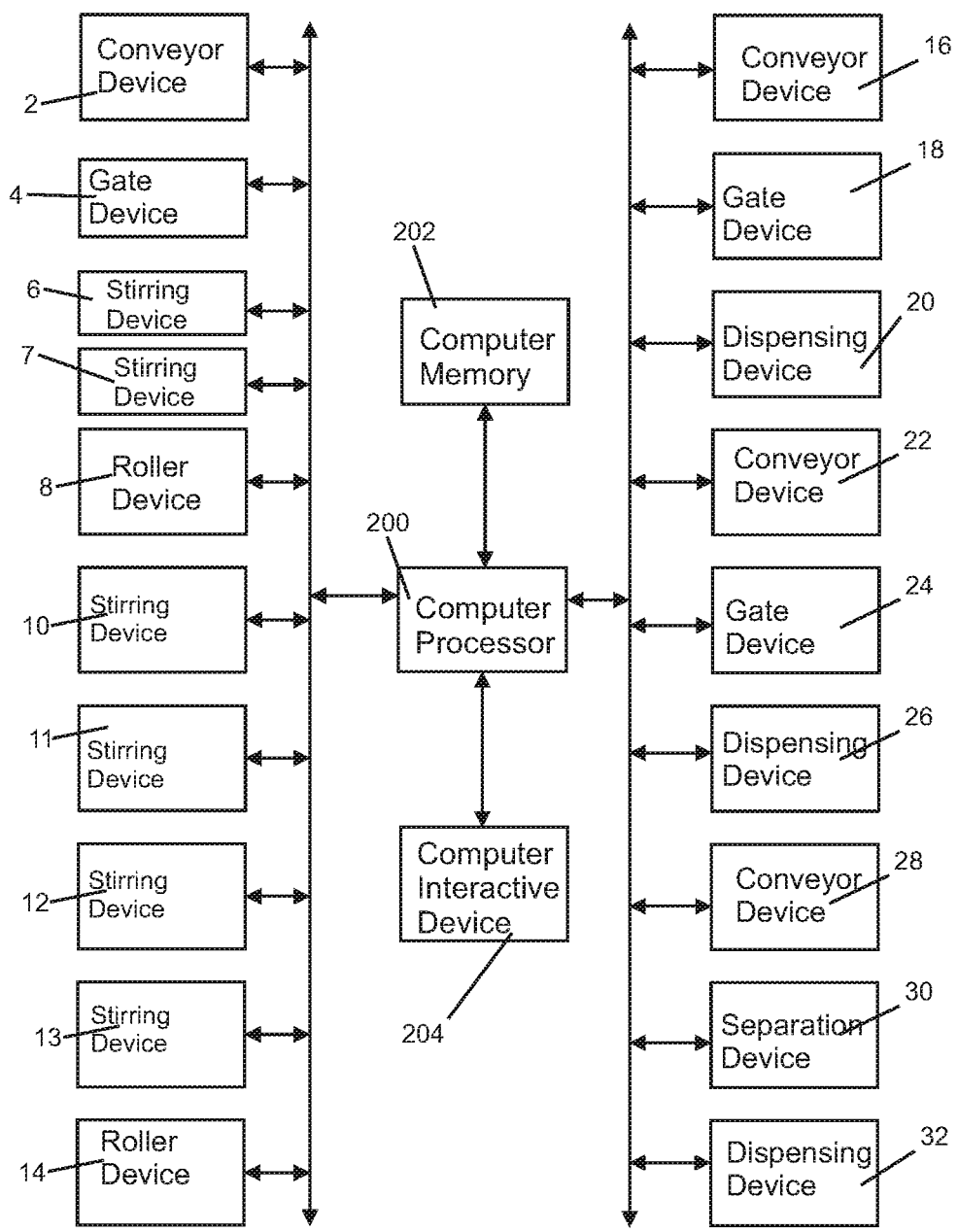
FIG. 11 shows a block diagram of a computer processor, computer memory, computer interactive device, and the communication between various devices shown in FIGS. 1-10 and the computer processor of FIG. 11.

FIG. 11 shows a block diagram of a computer processor 200, computer memory 202, computer interactive device 204, and the communication between various devices shown in FIGS. 1-10 and the computer processor 200 of FIG. 11. The computer memory 202 and the computer interactive device 204 communicate with and/or are linked to the computer processor 200 by communications links such as hardwired, wireless, optical, electrical, and/or any other known communications links.

As shown by FIG. 11, the devices 2, 4, 6, 7, 8, 10, 11, 12, 13, 14, 16, 18, 20, 22, 24, 26, 28, 30, and 32 communicate with the computer processor 200 via communications links such as hardwired, wireless, optical, electrical, and/or any other known communications links. The computer processor 200 may be programmed and/or instructed by a computer program stored in computer memory 202 to send one or more signals to control any of devices 2, 4, 6, 7, 8, 10, 11, 12, 13, 14, 16, 18, 20, 22, 24, 26, 28, 30, and 32. In addition, a person or user can use computer interactive device 204 to control any of devices 2, 4, 2, 4, 6, 7, 8, 10, 11, 12, 13, 14, 16, 18, 20, 22, 24, 26, 28, 30, and 32 through computer processor 200. The computer interactive device 204 may include a computer keyboard, computer mouse, and/or touch computer screen or monitor.

As shown in FIG. 1, the conveyor device 2 includes a conveyor belt 2a, and rollers 2b, 2c, 2d, and servo motor 2e. The gate device 4 includes members 4a and 4b, and plate 4c, which may be made of a hard metal material.

Figure 2:
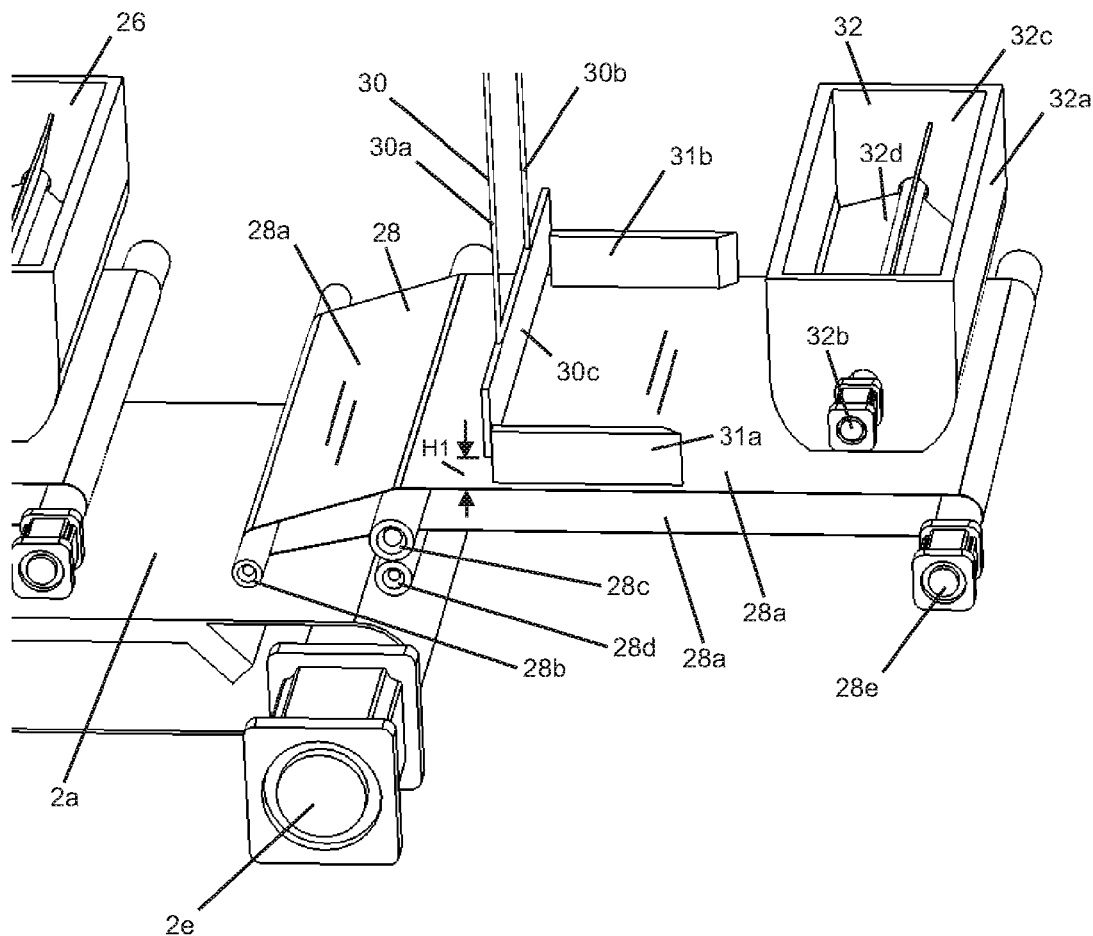
FIG. 2 shows a perspective close up view of part of the apparatus of FIG. 1.

As shown in FIG. 2, the conveyor device 28 includes a conveyor belt 28a, and rollers 28b, 28c, 28d, and servo motor 28e. The gate device 30 includes members 30a and 30b, and plate 30c which may be made of a hard metal material. The dispensing device 32 may have an opening 32c, a housing 32a, a servo motor 32b, and a valve or device for releasing material 32d.

Figure 3:
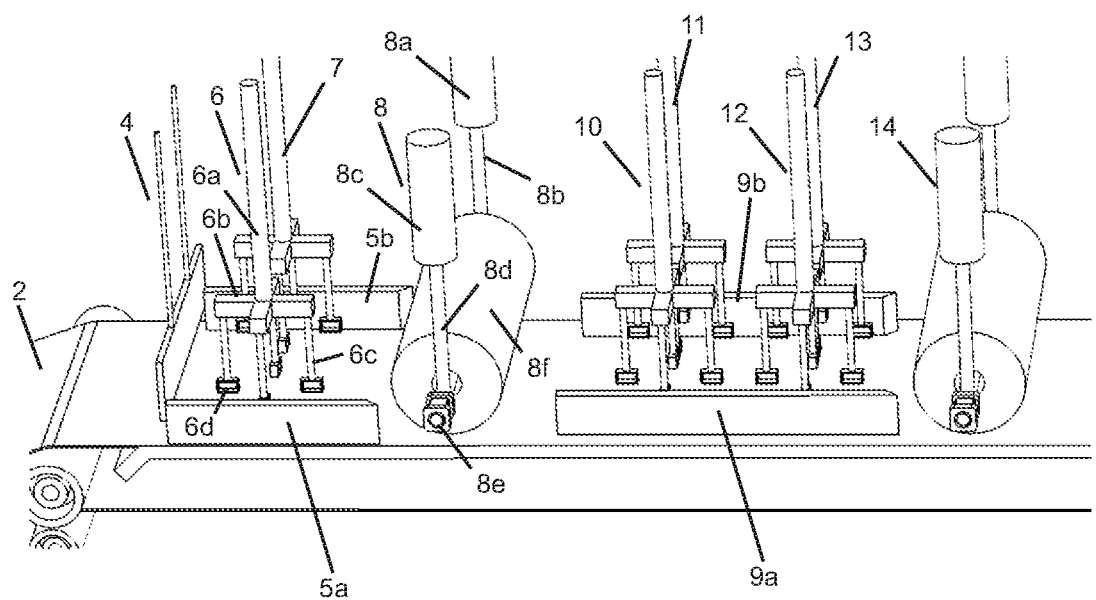
FIG. 3 shows a perspective close up view of part of the apparatus of FIG. 1.

FIG. 3 shows a perspective close up view of part of the apparatus 1 of FIG. 1. As shown in FIG. 3, the stirring device 6 includes a central vertical member 6a, a plurality of horizontal members 6b fixed to the central member 6a and forming a cross shape, a plurality of vertical legs 6c, fixed to a corresponding member of members 6b, and a plurality of footings or members 6d fixed to a corresponding member of members 6c. The stirring device 6 or 6a, 6b, 6c, and 6d may be made of a hard metal. Each of the stirring devices 7, 10, 11, 12, and 13 may be identical to the stirring device 6.

The roller device 8 includes members 8a, 8b, 8c, 8d, servo motor 8e, and roller 8f. The roller device 14 may be identical to the roller device 8.

Figure 4:
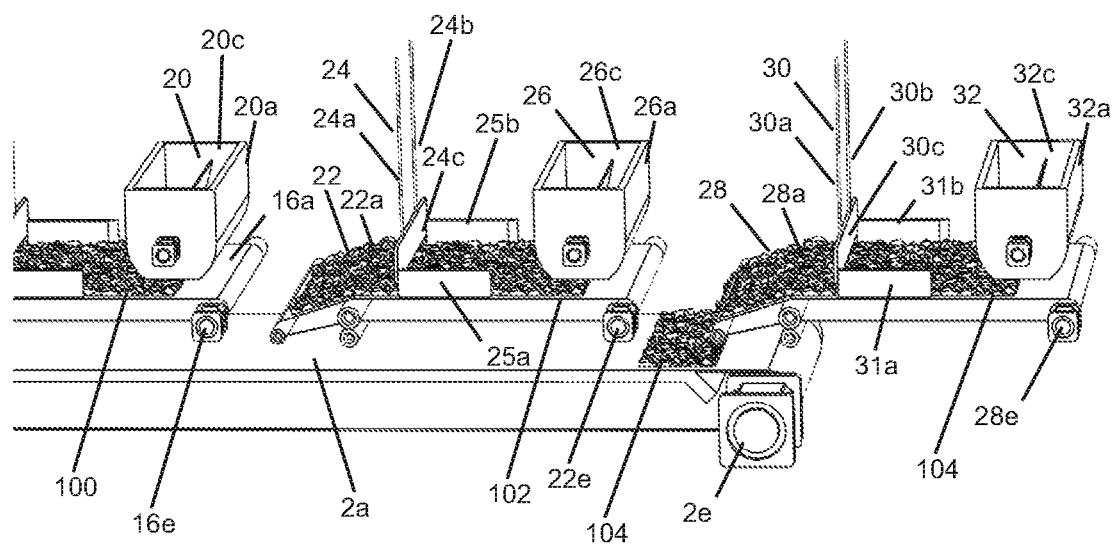
FIG. 4 shows a perspective close up view of part of the apparatus of FIG. 1, and with three materials also shown in FIG. 4, with the three materials shown in a first state.

FIG. 4 shows a perspective close up view of part of the apparatus 1 of FIG. 1, and with three materials 100, 102, and 104 also shown in FIG. 4, with the three materials 100, 102, and 104 shown in a first state. The dispensing device 20 has an opening 20c and a housing 20a. The conveyor device 16 includes a conveyor belt 16a. The conveyor device 22 includes a belt 22a. The gate device 24 includes members 24a and 24b, fixed to a plate 24.

Each of the gate devices 18, 24, and 30 may be identical to the gate device 4 (except that in one or more embodiments the plate or gate 4c of gate device 4 is typically wider than the corresponding plate or gate of gate devices 18, 24, 30, because the track 2a typically is wider, with a width W1 shown in FIG. 1, than the width W2 of tracks 16a, 22a, and 28a. For example the width W1 may be sixty-five inches and the width W2 may forty inches. Each of the dispensing devices 26 and 32 may be identical to the dispensing device 20.

The dispensing device 26 may include housing 26a and opening 26c. The gate device 30 may include members 30a and 30b, and plate 30c. The dispensing device 32 may include housing 32a and opening 32c.

Figure 5:
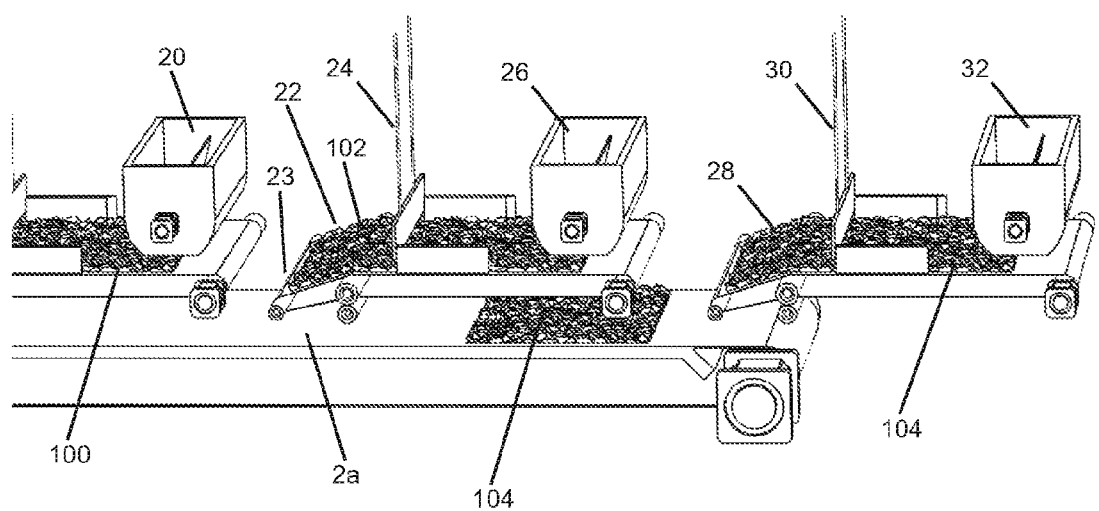
FIG. 5 shows a perspective close up view part of the apparatus of FIG. 1, and with the three materials also shown in FIG. 5, with the three materials shown in a second state.

FIG. 5 shows a perspective close up view part of the apparatus 1 of FIG. 1, and with the three materials 100, 102, and 104 also shown in FIG. 5, with the three materials 100, 102, and 104 shown in a second state.

Figure 6:
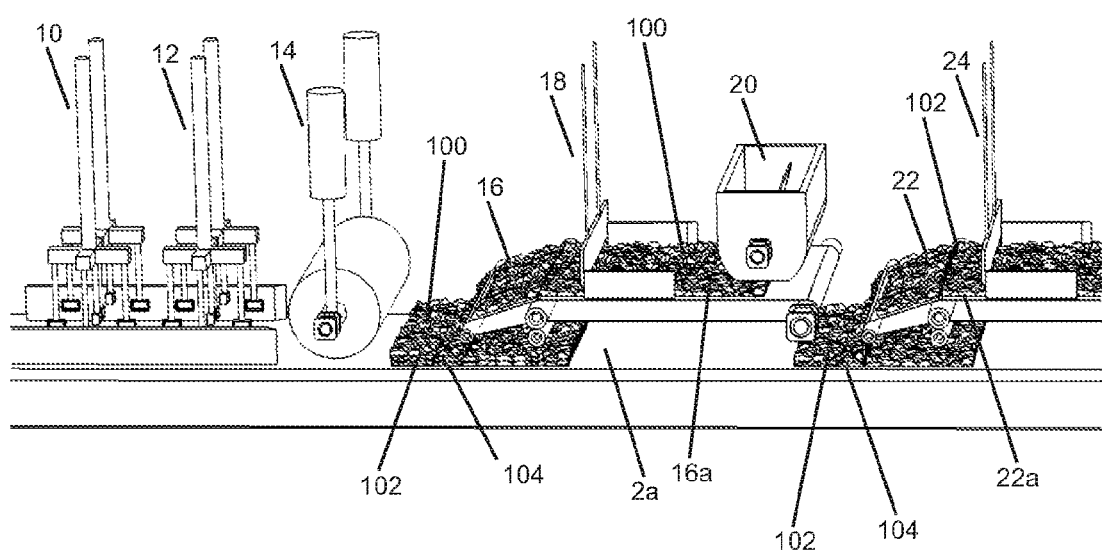
FIG. 6 shows a perspective close up view of part of the apparatus of FIG. 1, with some of a second of the three materials shown on top of some of a first of the three materials, and with some of a third of the three materials shown on top of the second and first of the three materials; in a third state.

FIG. 6 shows a perspective close up view of part of the apparatus 1 of FIG. 1, with some of the material 102 on conveyor belt 22a, some of the material 102 in a layer on top of a layer of material 104, and with some of the material 100 on conveyor belt 16a, and some of the material 100 in a layer on top of a layer of material 102 which is on top of a layer of material 104, in a third state.

Figure 7:
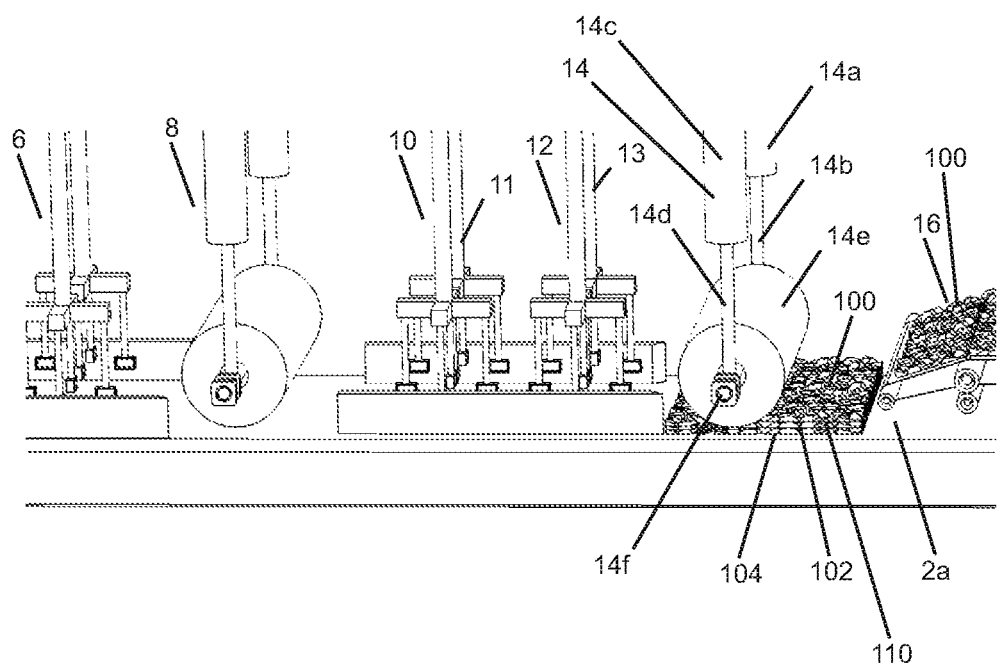
FIG. 7 shows a perspective close up view of part of the apparatus of FIG. 1, and some of the third material shown on top of some of the second material, which is on top of some of the first material in a combination, and some of the combination material been pressed by a roller device in a fourth state.

FIG. 7 shows a perspective close up view of part of the apparatus 1 of FIG. 1, with a layer of material 100 on top of a layer of material 102, on top of a layer of material 104, in the act of being pressed by the press roller 14e, in a fourth state.

Figure 8:
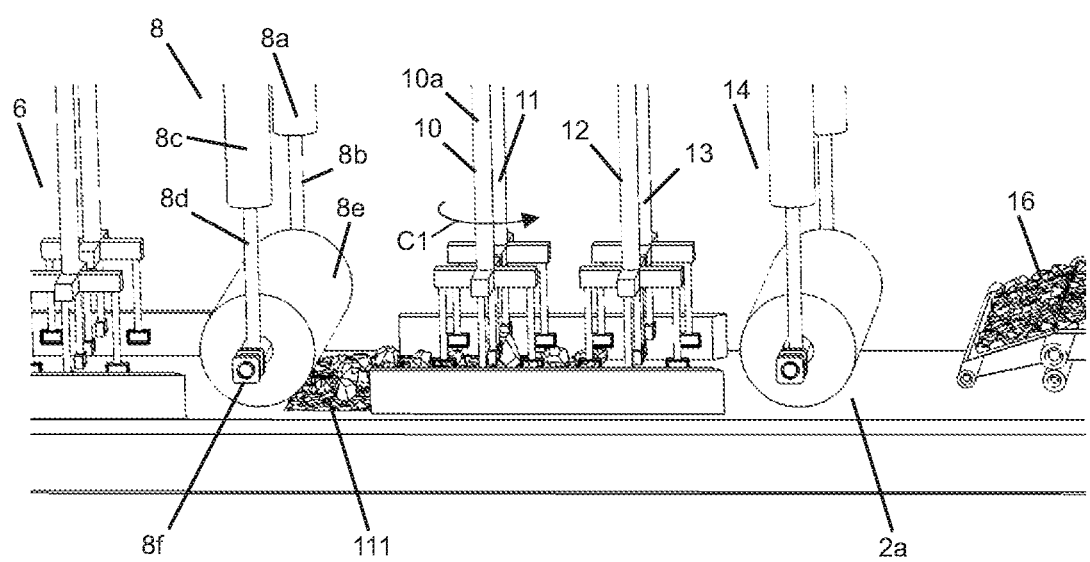
FIG. 8 shows a perspective close up view of part of the apparatus of FIG. 1 and with the combination of FIG. 7 pressed and mixed or stirred into a first modified combination; in a fifth state.

FIG. 8 shows a perspective close up view of part of the apparatus 1 of FIG. 1, with some of the material 100, some of the material 102, and some of the material 104 formed into a mixed or stirred combination 111 after pressing by roller 14e, and fragmenting and re-orientation by stirring devices 10, 11, 12, and 13, in a fifth state.

FIG. 9 shows a perspective close up view of part of the apparatus 1 of FIG. 1, with some of the material 100, some of the material 102, and some of the material 104 formed into a mixed or stirred and further pressed by roller 8e in order to maintain the swirls in a first modified combination 112, in a sixth state.

FIG. 10 shows a perspective close up view of part of the apparatus 1 of FIG. 1, with the first modified combination 112 passing through further stirring or mixing by stirring and/or mixing devices 6 and 7, and exiting the gate 4c, after the stages shown and described with reference to FIGS. 4-10 have been performed, as a second modified combination 113, in a seventh state.

In operation, referring to FIGS. 1, 2, 4, and FIG. 11, the computer processor 200 sends a signal to the dispensing devices 20, 26, and 32 to cause device 32d (shown in FIG. 2), which may include a servo motor, rotating blades, and a rectangular exit, and similar or identical devices in dispensing devices 20 and 26, to dispense material 100, 102, and 104 from rectangular exits of dispensing devices 20, 26, and 32 onto conveyor belts 16a, 22a, and 28a respectively, as shown in FIG. 4. Each housing or container of dispensing devices 20, 26, and 32 has a rectangular exit opening at the bottom which is less than the width of the belt 16a, 22a, and 28a, respectively, that lies below it, and the dispensing devices 20, 26, and 32 are situated so that the rectangular exit openings overlap, i.e. lie within the width of the belts 16a, 22a, and 28a, respectively.

The speed of the conveyor belts 16a, 22a, and 28a is controlled by servo motors 16e, 22e, and 28e respectively, wherein the servo motors are controlled by the computer processor 200.

The gate devices 4, 18, 24, and 30 can be adjusted to a certain height to allow desired amount of material pass, in response to a control signal or signals from the computer processor 200, to thereby control the height of composite material as it travels under the plate gate, such as gate 30c, shown in FIG. 2. For example, gate 30c may be set to a height of H1, as shown in FIG. 2, wherein a bottom edge of the gate 30c is parallel to a part of the belt 28a just below it, and a height or distance of H1, which may be about 1/32 inch to three inches above the belt 28a. This will cause material to pass under the gate 30c, between the edge of the gate 30c and the belt 28a, to set the height of the material to H1.

The speed of the rotating blades, such as of device 32d shown in FIG. 2 inside the container or housing 32 (or of corresponding housing of devices 20 and 26) and the speed of the corresponding belt, such as belt 28a for dispensing device 32, shown in FIG. 2, may be adjusted in order to obtain a desired amount of composite material per unit area on the belt 28a. Generally speaking if the belt 28a moves faster than the belt 2a, more material will pile up on the belt 2a. The gate device 30 (or gate devices 4, 18, and 24) can be raised or lowered in order to further adjust the amount of material or height of the material.

Based on the desired design aesthetic multiple sets of above can be used. Each secondary belt (such as each of belts 16a, 22a, and 28a, shown in FIG. 4, sits above a primary moving belt 2a driven by a servo motor 2e the speed of which can be controlled by computer processor 200. One composite material, such as material 104, from the first secondary belt (going from right to left), such as belt 28a, is dropped on to the primary moving belt 2a, such as shown in FIG. 4, to form the first layer of composite material. When the first composite material 104 on the primary belt 2a has traveled to the position of the front edge 23 of the second secondary belt 22a (i.e. lead edge of material 104 is at front edge 23, shown in FIG. 5, at front of belt 22a, the second composite material 102 from the second secondary belt 22a is dropped directly on top of the first layer of composite material, formed of material 104 to form two layers of different composite material, including material 102 on top of material 104. When this two-layer composite material on the primary belt 2a has traveled to the position of the third secondary belt 16a, such that the front edge of the combination of 102 and 104 is at the front edge 15, shown in FIG. 1, of the second belt 16a, then composite material from the third secondary belt 16a drops the third composite material 100 directly on top of the two-layer composite material to form a three-layer composite material (100 on top of 102, on top of 104, with the material 102 in between 100 and 104). More layers of composite material can be added in this fashion if needed.

A first press roller or rolling device 14 is used to compress the multi-layered composite material (including 100, 102, and 104). The press roller or rolling device 14 is lowered using compressed air, in response to a control signal or signals from the computer processor 200. The air pressure may be adjusted by the computer processor 200 so that the pressure exerted by the roller 14e of the roller device 14 onto the multi-layered composite material (100, 102, and 104) is equal throughout the length of the composite material on the belt 2a. The rotating speed of the roller 14e is controlled by the computer processor 200 so that the linear speed of the press roller 14e and primary belt 2a are the same. The composite material, then passes through a set of multi-pronged apparatus or stirring devices 10, 11, 12, and 13, in order to break up and reorient the multi-layered fragments of composite material. Each of devices 10, 11, 12, and 13 rotates to break up and reorient fragments. For example, device 10 rotates using its central member 10a, similar, identical or analogous to central member 6a of stirring device 6, as an axle and for its axis of rotation, so that device 10 can rotate in a counter clockwise direction C1 shown in FIG. 8 about the central member 10a or in a clockwise direction opposite C1. Devices 11, 12, and 13 may rotate in the same manner as device 10, about their respective central members, in for example a counterclockwise or clockwise direction.

The rotational speed of each of stirring devices 6, 7, 10, 11, 12, and 13 or multi-pronged devices is controlled by the computer processor 200 and may be adjusted by a user using computer interactive device 204 based on the final design aesthetic desired. The computer interactive device 204 may include a computer mouse, computer keyboard, and/or computer touch screen. The higher the rotational speed of any of the devices 6, 7, 10, 11, 12, or 13, such as in the direction C1, the smaller the fragments will be. The multi-layer compressed fragments of the composite material travels down the primary belt 2a to a second press roller 8e of the roller device 8 to compress the fragments of multi-layer of the composite material. The pressure that the second press roller 8 exerts on the fragments of composite material may be adjusted by a user using computer interactive device 204 which communicates to computer processor 200 and which is configured to adjust the pressure of roller 8, based on the final aesthetic desired in order to maintain the pattern contained inside the fragments. The rotating speed of the second press roller 8e of the roller device 8 is controlled so that the linear speed of the press roller 8e and the linear speed of the primary belt 2a are the same. The composite material then travels down the primary belt 2a to a second set of multi-pronged apparatus or devices 6 and 7 in order to again break up and reorient the multi-layered composite material. The rotational speed of the multi-pronged apparatus or devices 6 and 7 may be adjusted by use of computer memory 202 or computer interactive device 204 communicating to computer processor 200 which controls the rotational speed of devices 6 and 7 based on the final design aesthetic desired. The composite material then travels off the belt 2a through gate 4, the height of which can be adjusted by computer processor 200, for further processing.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
a computer processor;
a first dispensing device configured to be in communication with the computer processor and thereby controlled by the computer processor;
a second dispensing device configured to be in communication with the computer processor and thereby controlled by the computer processor;
a main conveyor device configured to be in communication with the computer processor and thereby controlled by the computer processor;
a first compression device configured to be in communication with the computer processor and thereby controlled by the computer processor;
a first stirring device configured to be in communication with the computer processor and thereby controlled by the computer processor; and
a second compression device configured to be in communication with the computer processor and thereby controlled by the computer processor;
wherein the first dispensing device is configured to supply a first material to a conveyor belt of the main conveyor device in response to control by the computer processor;
wherein the second dispensing device is configured to supply a second material on top of the first material, while the first material is on the conveyor belt to form a combination comprised of at least the first and second materials, in response to control by the computer processor;
wherein the combination is compressed by the first compression device in response to control by the computer processor;
wherein the compressed combination is stirred by the first stirring device in response to control by the computer processor to form a first modified combination; and
wherein the first modified combination is compressed by the second compression device in response to control by the computer processor to form a compressed first modified combination.

2. The apparatus of claim 1 further comprising
a first secondary conveyor device which includes a conveyor belt; and
a second secondary conveyor device which includes a conveyor belt;
wherein the first dispensing device supplies the first material to the conveyor belt of the main conveyor device by supplying the first material to the conveyor belt of the first secondary conveyor device which then supplies the first material to the conveyor belt of the main conveyor device, in response to control by the computer processor; and
wherein the second dispensing device supplies the second material to the conveyor belt of the main conveyor device by supplying the second material to the conveyor belt of the second secondary conveyor device which then supplies the second material to the conveyor belt of the main conveyor device, in response to control by the computer processor.

3. The apparatus of claim 2 further comprising
a first secondary gate device which includes a gate; and
a second secondary gate device which includes a gate;
and wherein the computer processor controls a height of the gate of the first secondary gate device above the conveyor belt of first secondary conveyor device to control a thickness of first material supplied by the first dispensing device to the conveyor belt of the main conveyor device; and
wherein the computer processor controls a height of the gate of the first secondary gate device above the conveyor belt of first secondary conveyor device to control a thickness of first material supplied by the first dispensing device to the conveyor belt of the main conveyor device.

4. The apparatus of claim 1 wherein
the first dispensing device is located at a first location along the main conveyor device, followed in series along the main conveyor device by the second dispensing device, the first compression device, the first stirring device, and the second compression device;
such that the first dispensing device is configured to supply the first material to the conveyor belt of the main conveyor device at the first location;
the second dispensing device is configured to supply the second material on top of the first material, at a second location, different from the first location;
the combination is compressed by the first compression device at a third location, different from the first and second locations, and further from the first location than the second location;
the compressed combination is stirred by the first stirring device at a fourth location, different from the first, second, and third locations, and further from the first location than the first, second, and third locations; and
the first modified combination is compressed by the second compression device in response at a fifth location, different from the first, second, third, and fourth locations, and further from the first location than the second, third, and fourth locations.

5. The apparatus of claim 1 further comprising
a main gate device;
wherein the main gate device includes a gate; and
wherein the computer processor controls a height of the gate above the conveyor belt of the main conveyor device to control a thickness of the compressed first modified combination.

6. The apparatus of claim 1 further comprising
a second stirring device configured to be in communication with the computer processor and thereby controlled by the computer processor; and
wherein the compressed first modified combination is stirred by the second stirring device in response to control by the computer processor to form a second modified combination.

7. The apparatus of claim 6 further comprising
a main gate device;
wherein the main gate device includes a gate; and
wherein the computer processor controls a height of the gate above the conveyor belt of the main conveyor device to control a thickness of the second modified combination.

8. A method comprising
supplying a first material to a conveyor belt of a main conveyor device;
moving the first material by use of the conveyor belt;
supplying a second material on top of the first material, while the first material is on the conveyor belt to form a combination comprised of at least the first and second materials;
compressing the combination;
stirring the compressed combination to form a first modified combination; and
compressing the first modified combination to form a compressed first modified combination.

9. The method of claim 8 wherein
the step of compressing the combination occurs after the combination has been moved by use of the conveyor belt from a first location where the step of supplying the second material on top of the first material occurred to a second location, which is different from the first location;
wherein the step of stirring the compressed combination occurs after the compressed combination has been moved by use of the conveyor belt from the second location to a third location which is different from the first location and the second location; and
wherein the step of the step of compressing the first modified combination occurs after the first modified combination has been moved by use of the conveyor belt from the third location to a fourth location which is different from the first location, the second location, and the third location.

10. The method of claim 8 further comprising
controlling a height of a gate above the conveyor belt of the main conveyor device to control a thickness of the compressed first modified combination.

11. The method of claim 8 wherein
the first material is a crushed mixture which includes at least one of the following: particulate stone, quartz, glass, shells, silicon, polymer resins, binders, and colorants; and
the second material is a crushed mixture which includes at least one of the following: particulate stone, quartz, glass, shells, silicon, polymer resins, binders, and colorants.

12. The method of claim 8 further comprising
stirring the compressed first modified combination to form a second modified combination.

13. The method of claim 12 further comprising
controlling a height of a gate above the conveyor belt of the main conveyor device to control a thickness of the second modified combination.

14. The method of claim 8 wherein
the step of supplying the first material to the conveyor belt of the main conveyor device is performed at least in part by a first secondary conveyor device having a conveyor belt; and
and the step of supplying the second material on top of the first material is performed at least in part by a second secondary conveyor device having a conveyor belt.

15. The method of claim 14 wherein
the step of supplying the first material to the conveyor belt of the main conveyor device is performed at least in part by a first secondary gate device, wherein a gate of the first secondary gate device is controlled to be a specific height above the conveyor belt of first secondary conveyor device to control a thickness of first material supplied by the first dispensing device to the conveyor belt of the main conveyor device; and
wherein the step of supplying the second material on top of the first material is performed at least in part by a second secondary gate device, wherein a gate of the second secondary device is controlled to be a specific height above the conveyor belt of second secondary conveyor device to control a thickness of second material supplied by the second dispensing device to the conveyor belt of the main conveyor device.

* * * * *